(12) United States Patent
Weder

(10) Patent No.: US 8,523,118 B2
(45) Date of Patent: Sep. 3, 2013

(54) COLLAPSIBLE FLORAL PLAQUE FOR CASKET AND/OR HEADSTONE AND METHODS OF PRODUCTION AND USE THEREOF

(75) Inventor: Donald E. Weder, Highland, IL (US)

(73) Assignee: Wanda M. Weder & William F. Straeter, Highland, IL (US), not individually but solely as Trustees of The Family Trust U/T/A dated Dec. 8, 1995.

( * ) Notice: Subject to any disclaimer, the term of this patent is extended or adjusted under 35 U.S.C. 154(b) by 0 days.

(21) Appl. No.: 13/491,107

(22) Filed: Jun. 7, 2012

(65) Prior Publication Data

US 2012/0246906 A1 Oct. 4, 2012

Related U.S. Application Data

(63) Continuation of application No. 12/893,120, filed on Sep. 29, 2010, now abandoned, which is a continuation of application No. 11/472,039, filed on Jun. 21, 2006, now abandoned.

(60) Provisional application No. 60/692,688, filed on Jun. 21, 2005.

(51) Int. Cl.
*A47G 7/00* (2006.01)

(52) U.S. Cl.
USPC .......... 248/27.8; 248/151; 248/432; 248/460; 47/39; 47/40.01

(58) Field of Classification Search
USPC ............ 248/27.8, 309.1, 457, 460, 302, 523, 248/163.1, 165, 166, 440, 150, 151, 316.4, 248/316.7, 432, 441.1, 447.1, 447.2, 463, 248/464, 465; 47/39, 41.01; 27/18, 26, 27; 29/428
See application file for complete search history.

(56) References Cited

U.S. PATENT DOCUMENTS

| | | | |
|---|---|---|---|
| 2,035,288 A | 3/1936 | Aughtry | |
| 2,389,447 A | 11/1945 | Meadows | |
| 2,671,628 A | 3/1954 | Everhard | |
| 2,940,705 A | 6/1960 | Lotz | |
| 3,269,555 A | 8/1966 | Henderson | |
| 3,290,820 A | 12/1966 | Aebersold | |
| 3,511,461 A | 5/1970 | Clark | |
| 3,962,825 A * | 6/1976 | O'Connell | 47/41.12 |
| 4,640,045 A | 2/1987 | Nesbitt et al. | |
| 5,368,266 A | 11/1994 | Allen | |
| 5,711,502 A | 1/1998 | Emalfarb et al. | |
| 5,909,922 A | 6/1999 | Dugas | |
| 6,688,040 B1 * | 2/2004 | Yang | 47/41.1 |
| 7,305,794 B1 | 12/2007 | Cantrell | |
| 7,320,162 B2 | 1/2008 | Parker et al. | |
| 7,735,800 B2 * | 6/2010 | Lunato et al. | 248/558 |
| 2007/0007421 A1 * | 1/2007 | Weder | 248/441.1 |

(Continued)

OTHER PUBLICATIONS

Thompson Monuments, Flower Saddles for Tops of Monuments, Webster City, IA.

(Continued)

*Primary Examiner* — Tan Le
(74) *Attorney, Agent, or Firm* — Dunlap Codding, P.C.

(57) ABSTRACT

A method for forming a collapsible plaque for holding floral objects is disclosed. The collapsible plaque may be used with a casket or headstone for display of a floral object thereon.

4 Claims, 9 Drawing Sheets

(56) References Cited

U.S. PATENT DOCUMENTS

| | | | |
|---|---|---|---|
| 2008/0023594 A1* | 1/2008 | Weder | 248/27.8 |
| 2009/0000974 A9 | 1/2009 | Weder | |
| 2011/0010916 A1* | 1/2011 | Weder | 29/428 |

OTHER PUBLICATIONS

Wire and Design Tools, Casket Plaques, Highland Supply Corporation (2003).

* cited by examiner

COLLAPSIBLE FLORAL PLAQUE FOR CASKET AND/OR HEADSTONE AND METHODS OF PRODUCTION AND USE THEREOF

CROSS REFERENCE TO RELATED APPLICATIONS

The present application is a continuation of U.S. Ser. No. 12/893,120, filed Sep. 29, 2010, now abandoned; which is a continuation of U.S. Ser. No. 11/472,039, filed Jun. 21, 2006, now abandoned; which claims the benefit of U.S. Provisional Application Ser. No. 60/692,688, filed Jun. 21, 2005. The entire contents of each of the above-referenced patents and patent applications are hereby incorporated by reference herein.

STATEMENT REGARDING FEDERALLY SPONSORED RESEARCH OR DEVELOPMENT

Not applicable.

BACKGROUND OF THE INVENTION

1. Field of the Invention

The presently disclosed and claimed inventive concept(s) relates generally to stone and casket plaque easels for holding a floral object, and more particularly but not by way of limitation, to an erectable or collapsible stone and casket plaque easel for holding and/or supporting a floral object. In yet another aspect, the presently disclosed and claimed inventive concept(s) relates to methods of shipping a stone and casket plaque easel, methods of using a stone and casket plaque easel, methods of storing a stone and casket plaque easel, and methods of placing a floral object on a stone and casket plaque easel.

2. Description of the Related Art

Stone and casket plaque easels are used in the floral, funeral and headstone industries to support and display flower sprays atop caskets and/or headstones. Current stone and casket plaque easels are cumbersome making them difficult to ship, store, and transport due to their awkward, bulky nature. Stone and casket plaque easels are usually constructed of materials such as, for example, steel. Such stone and casket plaque easels do not have the ability to readily dissemble or collapse into a position that is compact and easily manageable. Typically, for example, the legs of current stone and casket plaque easels are in a fixed (erected) position (for example, the prior art stone and casket plaque easel shown in FIG. 1) making it impossible to dissemble or collapse the stone and casket plaque easel for shipment, transportation and/or storage.

Currently, florists attach floral sprays to current stone and casket plaque easels by affixing the spray to or placing the spray on a central support member of the easel. The easel must then be transported in a fixed erect position to a designated location for placement on a headstone/plaque and/or casket. After a funeral visitation or service in the funeral home or chapel, the current stone and casket plaque easel is removed in the fixed, erect position for transportation. The easel is then transported to the cemetery where the easel is placed atop a casket for use again during a grave side service or as a decoration at the grave site after the service. These stone and casket plaque easels are frequently transported to various ceremonies and recycled for subsequent use. The transportability of current stone and casket plaque easels is therefore not maximized because of the bulky nature of these easels.

Further, shipping and/or freight costs currently reflect the cumbersome nature of shipping current stone and casket plaque easels. For example, depending on the freight zone, freight costs may range from 9.26% to 36.14% of the total manufacturing costs. This is because current stone and casket plaque easels are produced in a factory and shipped to a designated location in the fixed, erected position. Shipping these types of stone and casket plaque easels is costly due to the large amount of space that the current stone and casket plaque easels require. A stone and casket plaque easel that is fully or partially collapsible would dramatically decrease shipping costs, for example, fully or partially collapsible stone and casket plaque easels may reduce freight costs by up to 75% when compared to the freight costs of current non-collapsible stone and casket plaque easels.

Warehousing space must also be maximized to accommodate storage of such stone and casket plaque easels. For example, when arriving at a distributorship or flower shop, current stone and casket plaque easels require the manufacturer, distributor or florist to provide an excessive and unnecessary amount of storage space for these non-collapsible easels.

It is to this end that there is a need in the industry for a fully or partially erectable or collapsible stone and casket plaque easel that overcomes the disadvantages and defects of current stone and casket plaque easels, and that is compact, easily transportable, and less expensive to ship and store. It is to such a stone and casket plaque easel that the presently disclosed and claimed inventive concept(s) is directed.

DETAILED DESCRIPTION OF THE INVENTIVE CONCEPT(S)

Figure 1:
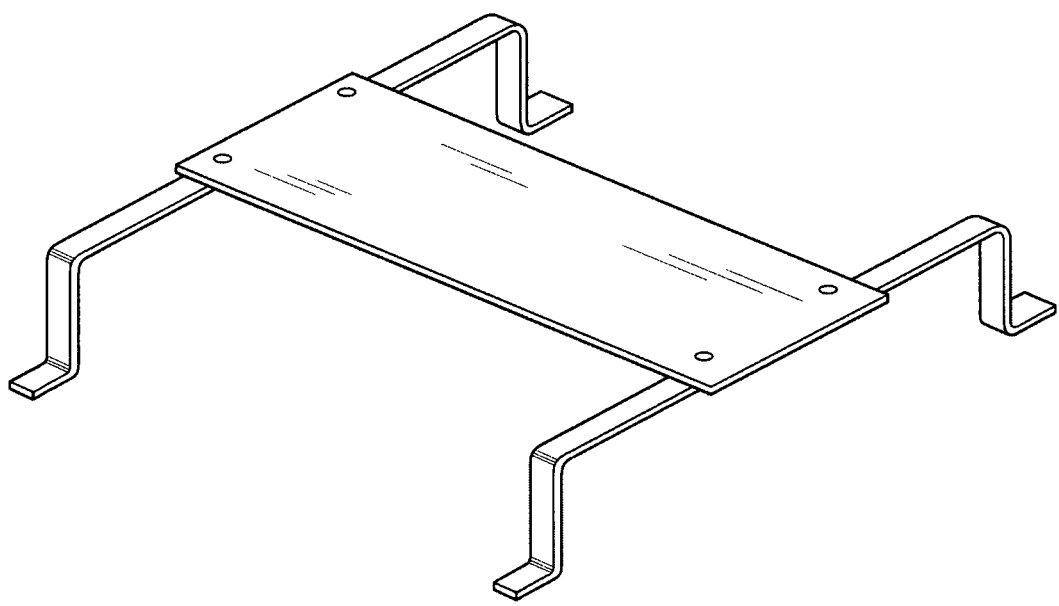
FIG. 1 is a perspective view of a stone and casket plaque easel found in the prior art.

It is to be understood that the presently disclosed and claimed inventive concept(s) is not limited in its application to the details of construction and the arrangements of the components set forth in the following description or illustrated in the drawings. The presently disclosed and claimed inventive concept(s) is capable of other embodiments or of being practiced or carried out in various ways which would be plain to one of ordinary skill in the art given the present specification and drawings appended hereto. Also, it is to be understood that the phraseology and terminology employed herein is for purpose of description and should not be regarded as limiting.

The presently disclosed and claimed inventive concept(s) is directed to a fully or partially erectable or collapsible stone and casket plaque easel for holding a floral object. In one embodiment, the stone and casket plaque easel has at least two leg members, each of the leg members having a first end and a second end, the central portion of each of the leg members being connected to a support member for supporting and/or holding a floral object such as, for example, a floral spray wherein the leg members are moveable from an erect position to a collapsed position wherein the leg members occupy a lesser volume of space and further wherein the at least two legs are self-erecting from the collapsed position to the erect position. The stone and casket plaque easel of the presently disclosed and claimed inventive concept(s) may be erectable, collapsible, erectable and collapsible, semi-erectable, semi-collapsible, semi-erectable and semi-collapsible, self-erecting, self-collapsing, self-erecting and self-collapsing, semi-self-erecting, semi-self-collapsing and/or semi-self-erecting and semi-self-collapsing.

Additionally, the presently disclosed and claimed inventive concept(s) relates to methods of shipping an erectable or collapsible stone and casket plaque easel, methods of using an erectable or collapsible stone and casket plaque easel, methods of storing an erectable or collapsible stone and casket plaque easel, methods of placing a floral object on an erectable or collapsible easel, and methods of displaying a floral object on or about an erectable or collapsible stone and casket plaque easel.

All of the embodiments of the stone and casket plaque easel described herein may be fully erectable and/or collapsible, semi-erectable and/or semi-collapsible, self-erectable and/or self-collapsible, semi-self-erectable and/or semi-self-collapsible, and combinations thereof. Further, all of the embodiments of the stone and casket plaque easel described herein may be erectable without being collapsible and vice-versa.

The terms "erectable", "erect", or "assembled" are synonymous herein and mean that the stone and casket plaque easel is deployed fully for use as intended, i.e., placement on or over a headstone, plaque or casket for display of a floral object. The terms "collapsible", "collapsed", or "dissembled" are synonymous herein and mean that the stone and casket plaque easel is positioned such that at least one of the plurality of leg members are capable of being positioned in or are positioned in a fully or partially collapsed position. The term "fully erectable" as used herein means that at least one of the plurality of leg members are capable of being positioned in or are positioned in the erect position. The term "partially erectable" or "semi-erectable" as used herein means that one of the plurality of leg members of the stone and casket plaque easel is in a fully erected position or any number of the plurality of leg members are in a partially erected position.

Any of the embodiments of the stone and casket plaque easel described herein may be fully or partially collapsible. The term "fully collapsible" as used herein means that at least one of the plurality of leg members are capable of being positioned in the fully collapsed position. The term "partially collapsible" or "semi-collapsible" as used herein means that one of the plurality of leg members is in a fully collapsed position or any number of the plurality of leg members are in a partially collapsed position. Also, the stone and casket plaque easel may be reversibly erectable or irreversibly erectable (i.e., once erected, the stone and casket plaque easel may not be collapsed and/or vice-versa). It should also be understood that the stone and casket plaque easel 10 may only be capable of erecting yet not collapsing, collapsing yet not erecting, and both erecting and collapsing.

The term "floral object" as used herein will be understood to include any floral object which can be placed on a stone and casket plaque easel such as, but not limited to, a floral grouping, a floral decoration, a wreath, potted plants, foam shapes (for example, a cross, words (i.e., mom), a flag), non-floral objects such as, for example, a photograph, a piece of artwork, a flag or any other object that is capable of being displayed on a stone and casket plaque easel.

The term "floral grouping" as used herein refers to a single flower, foliage, a botanical item, a propagule, cut flowers, and/or other fresh and/or artificial plants or floral materials, including secondary plants, growing potted plants having a root portion and/or other ornamentation which adds to the aesthetic qualities of the overall floral grouping. The term "floral grouping" as used herein may also refer to a "floral grouping", as defined above, which is disposed within a pot or a flower pot.

Figure 2A:
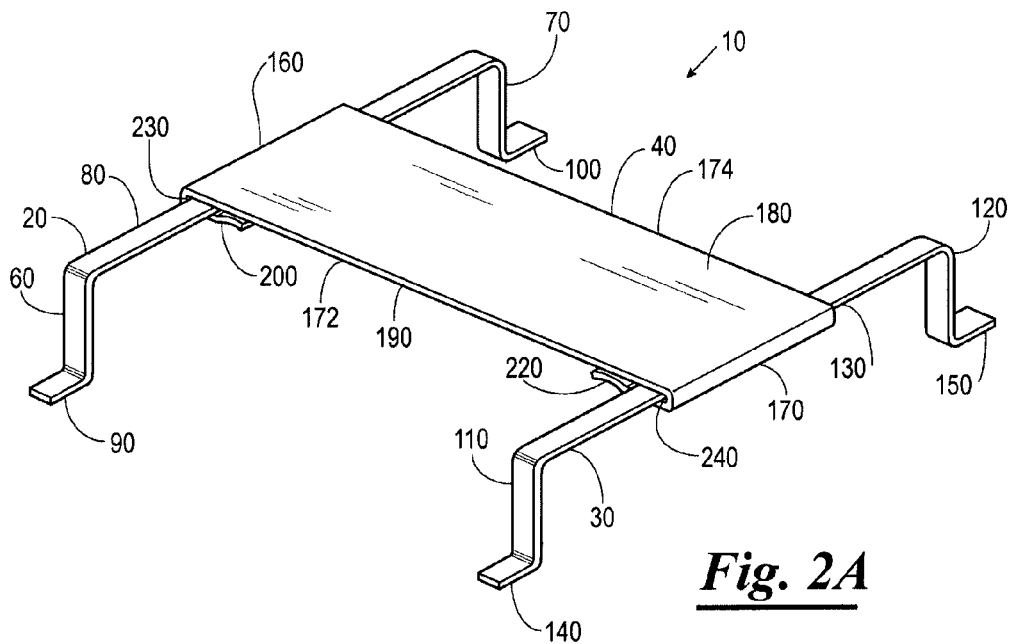
FIG. 2A is a perspective view of one embodiment of an erectable and/or collapsible stone and casket plaque easel of the presently disclosed and claimed inventive concept(s) in the erect position.
Figure 2B:
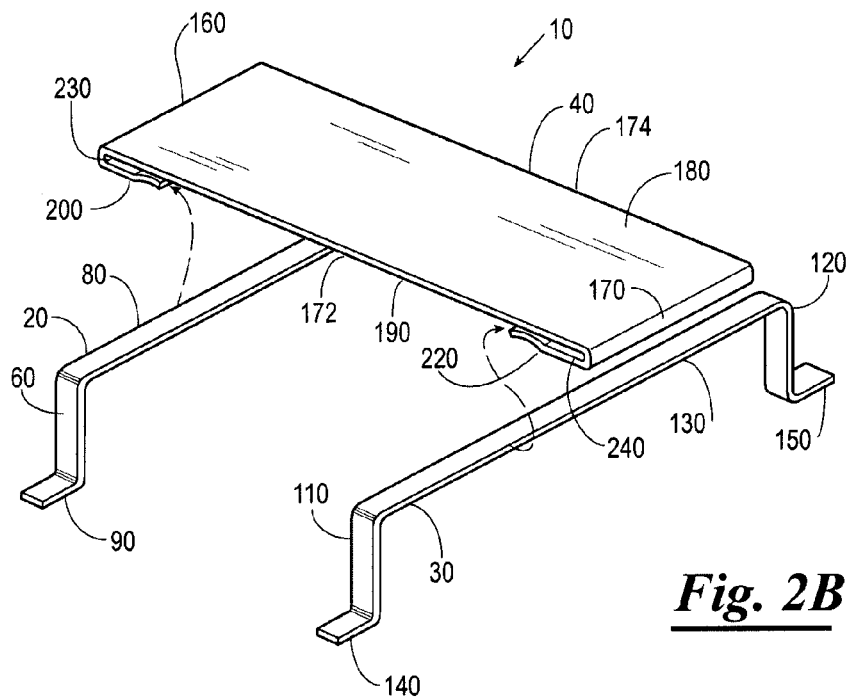
FIG. 2B is a second perspective view of the embodiment of the erectable and/or collapsible stone and casket plaque easel shown in FIG. 2A in the collapsed position.
Figure 2C:
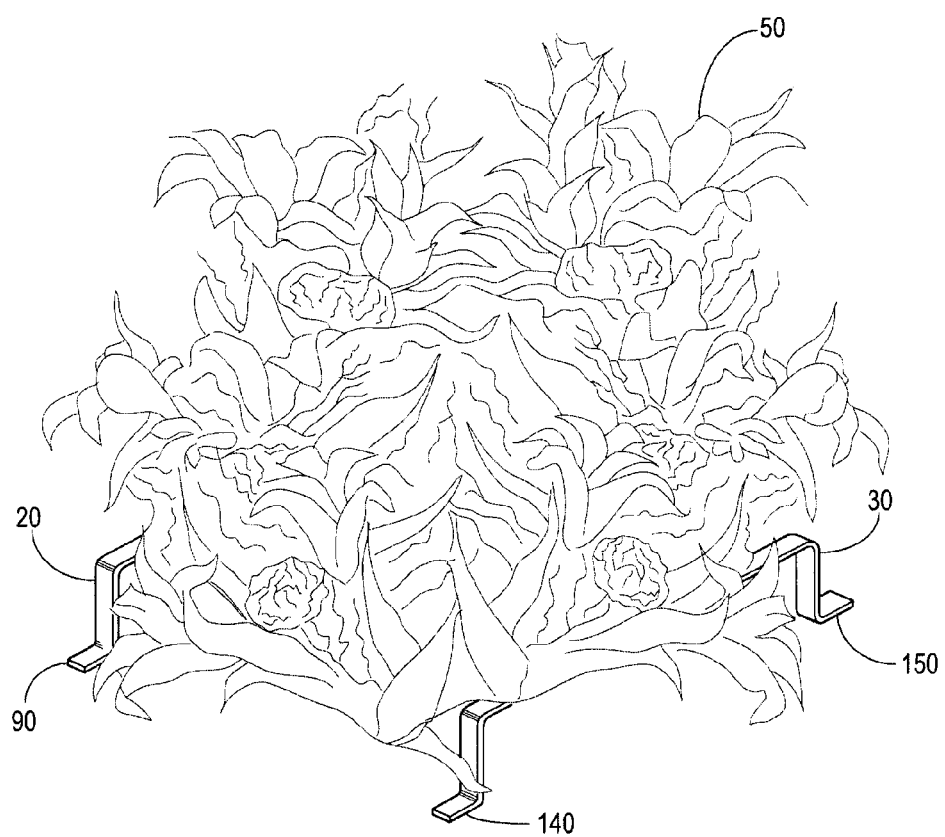
FIG. 2C is a third perspective view of the erectable and/or collapsible stone and casket plaque easel shown in FIG. 2A in the erect position having a floral object placed thereon.

Referring now to FIGS. 2A-2C, designated generally by the reference numeral 10 is a stone and casket plaque easel. The stone and casket plaque easel 10 has a plurality of leg members and, in one embodiment shown in FIGS. 2A-2C, the stone and casket plaque easel 10 has a first leg member 20 and a second leg member 30. The stone and casket plaque easel 10 also includes a support member 40 for supporting and/or holding a floral object 50, as shown in FIG. 2C.

The first leg member 20 has a first end 60, a second end 70, and a central portion 80. Each end of the first end 60 and the second end 70 is substantially L-shaped having surface engaging members 90 and 100, respectively, for supporting each end of the first leg member 20. The second leg member 30 has a first end 110, a second end 120, and a central portion 130. Each of the first end 110 and the second end 120 is substantially L-shaped having surface engaging members 140 and 150, respectively, for supporting each end of the second leg member 30. It should be understood that the surface engaging members 90, 100, 140, and 150 may be eliminated from the stone and casket plaque easel 10 without destroying the intended function thereof. That is, in one embodiment, the surface engaging member 90, 100, 140, and 150 are used to support the stone and casket plaque easel 10 when positioned on a substrate, such as the ground. However, when the stone and casket plaque easel 10 is positioned on top of a headstone or casket as described herein, the surface engaging members 90, 100, 140, and 150 may be eliminated without destroying the intended function of the presently disclosed and claimed inventive concept(s).

As shown in FIGS. 2A-2C, the leg members may be constructed of a unitary piece of material such as, for example, flattened aluminum rod. However, it should be understood that the leg members of the presently disclosed and claimed inventive concept(s) may be constructed of materials such as, for example, steel rod (tubular, flat, or profile shaped) and/or wire (coated or uncoated), aluminum rod (tubular, flat, or profile shaped) and/or wire (coated, anodized or uncoated), stainless steel rod (flat or profile shaped) and/or wire (coated or uncoated), plastic pieces of material having cylindrical, tubular, triangular, square, rectangular, polygonal, or other profile shapes or cross-sections of profile shapes, hollow, tubular or profile shaped materials made of metals or polymers, solid or hollow wood, synthetic or man-made materials, natural materials, or any other suitable material. Further, the material may be flexible or rigid.

Alternatively, the first leg member 20 and the second leg member 30 may be formed of two or more pieces of material. If the first leg member 20 and the second leg member 30 are formed of two or more pieces of material, the materials may differ or the materials may be the same. For example, if the first leg member 20 and the second leg member 30 are formed of two or more pieces of material, one of the leg members may be formed of steel and the other may be formed of aluminum. In another embodiment, each of the plurality of leg members may be formed of at least two or more materials. For example, a portion of at least one of the leg members may be steel and another portion of the leg member may be aluminum. The plurality of leg members may be constructed of the same material or a different material. For example, at least one of the plurality of leg members may be constructed of steel and the other leg members may be constructed of aluminum.

The leg members may have any size diameter, width, or profile dimensions and/or any length that is desired and useful for the particular use the stone and casket plaque easel 10 is put. In general, however, the stone and casket plaque easel 10 will have a height of from about 1" to about 6", more preferably a height from about 1" to about 4", and most preferably a height from about 1" to about 3".

The surface engaging members are generally in contact with a substrate (not shown) to thereby support and hold the stone and casket plaque easel 10 in a position suitable for use to support a floral object. The substrate may be any surface such as, for example, a floor, a platform, dirt, grass, fiber, plastic, tile, carpet, combinations thereof, or any surface capable of supporting the stone and casket plaque easel 10 thereon. It should be understood that the surface engaging members may be eliminated without altering the spirit and scope of the presently disclosed and claimed inventive concept(s).

Each embodiment of the stone and casket plaque easel 10 described herein could be used with or without anchoring materials known in the art to prevent the stone and casket plaque easel 10 from moving or tipping. The anchoring materials may be connected to the surface engaging members or alternatively be an extension of the leg members. Examples of anchoring materials include, but are not limited to, adhesive, cohesive, spikes (metal or plastic), rubber feet or pads, combinations thereof, or any other materials capable of anchoring the stone and casket plaque easel 10 to the substrate. The anchoring material may be formed integrally or non-integrally with the stone and casket plaque easel 10 and may be constructed of the same or different material as the stone and casket plaque easel 10.

The support member 40 for supporting and/or holding the floral object 50 may be formed of the same material as the leg members (i.e., aluminum) or may be formed of a different material than the leg members such as, for example, any of the materials discussed above. As shown in FIGS. 2A-2C, the support member 40 is substantially rectangular in shape and has a first end 160, a second end 170, a first side 172, a second side 174, a first surface 180, and a second surface 190. Though the support member 40 shown in FIGS. 2A-2B is substantially rectangular in shape, it should be understood that the support member 40 may be shaped in any manner to substantially conform to the shape of the casket and/or plaque. The support member 40 includes a first lip member 200 and a second lip member 220 for ease of connecting and/or disconnecting the leg members to the support member 40 for erecting and/or collapsing the stone and casket plaque easel 10.

The first lip member 200 and the second lip member 220 are located on the second surface 190 of the first end 160 and the second surface 190 of the second end 170, respectively, of the support member 40. The first lip member 200 and the second lip member 220 each include a retaining area 230 and 240, respectively, for retaining a portion of each leg member therein when each leg member is connected to the support member 40. The first lip member 200 and the second lip member 220 may be flexible or substantially flexible so as to bend outwardly away from the second surface 190 to facilitate engagement with the plurality of legs.

As shown in FIG. 2B, when inserting each respective leg member into its respective retaining area, the user may need (although not necessary) to create a separation between the distal end of the lip member and the second surface 190 of the support member 40 for insertion of the leg member into its respective retaining member. Further, when dissembling the leg members from the support member 40 for transportation, shipment, or storage, the lip members must be separated from the support member 40 to remove each leg member from its respective retaining area (FIG. 2B).

The first lip member 200 and the second lip member 220 may be unitary in construction with the support member 40, as shown in FIGS. 2A-2B, or the lip members may be formed separately from the support member 40. The lip members may also be constructed of the same material as the support member 40, or the lip members may be constructed of a different material than the support member 40.

Figure 2D:
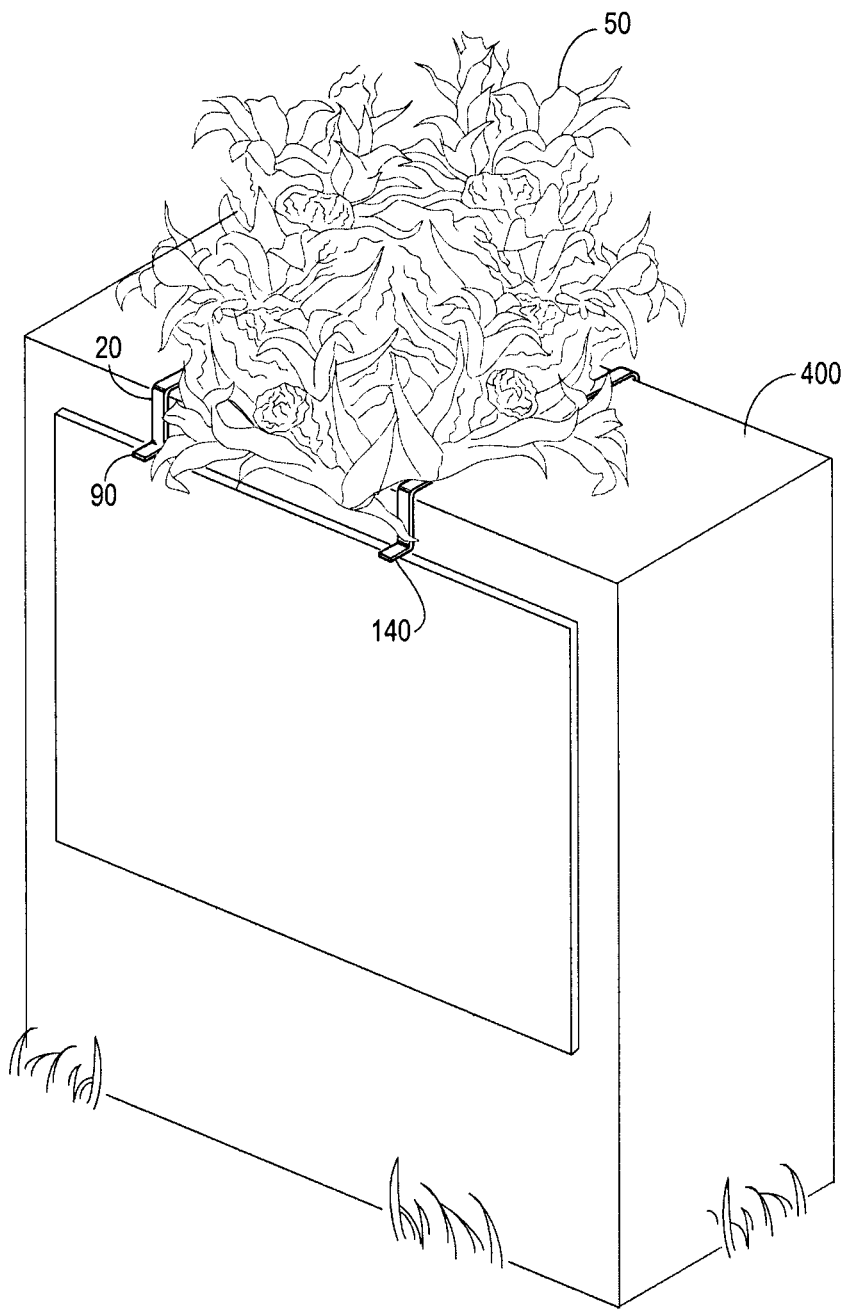
FIG. 2D is a perspective view of the erectable and/or collapsible stone and casket plaque easel shown in FIG. 2A placed on a headstone.

Shown in FIG. 2D, the first leg member 20 and the second leg member 30 are positioned about a portion of a headstone 400 such that the first end 60 and the second end 70 of the first leg member 20 are positioned on opposing sides of the headstone 400 and the first end 110 and the second end 120 of the second leg member 30 are positioned on opposing sides of the headstone 400 thereby supporting the support member 40 on the headstone 400 for display of the floral object 50 thereon.

Figure 2E:
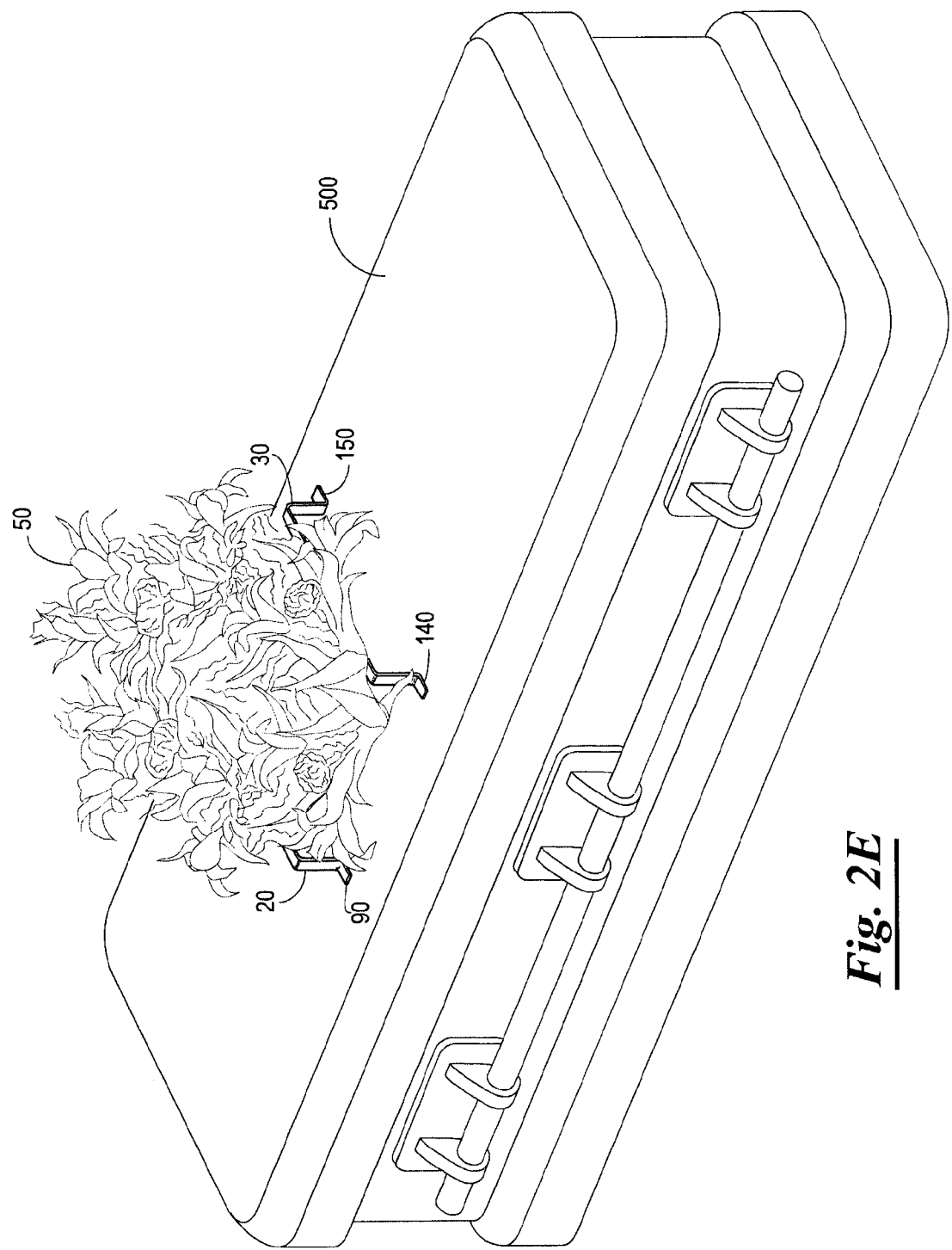
FIG. 2E is a perspective view of the erectable and/or collapsible stone and casket plaque easel shown in FIG. 2A placed on a casket.

Shown in FIG. 2E, the first leg member 20 and the second leg member 30 are positioned about a portion of a casket 500 such that the first end 60 and the second end 70 of the first leg member 20 are positioned on opposing sides of the casket 500 and the first end 110 and the second end 120 of the second leg member 30 are positioned on opposing sides of the casket 500 thereby supporting the support member 40 on the headstone 400.

It should be understood that any of the embodiments of the casket and plaque easel described herein may be positioned on a headstone or casket in the same manner as described above in relation to the embodiment shown in FIGS. 2A-2E for display of the floral object 50 thereon.

Figure 3A:
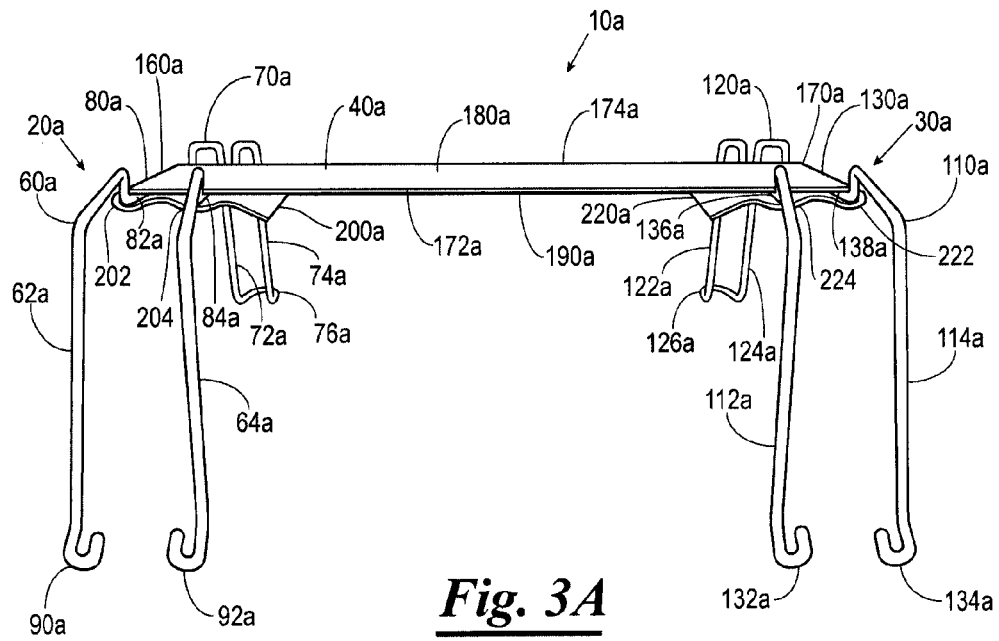
FIG. 3A is a perspective view of another embodiment of the erectable and/or collapsible stone and casket plaque easel of the presently disclosed and claimed inventive concept(s) in the erect position.
Figure 3B:
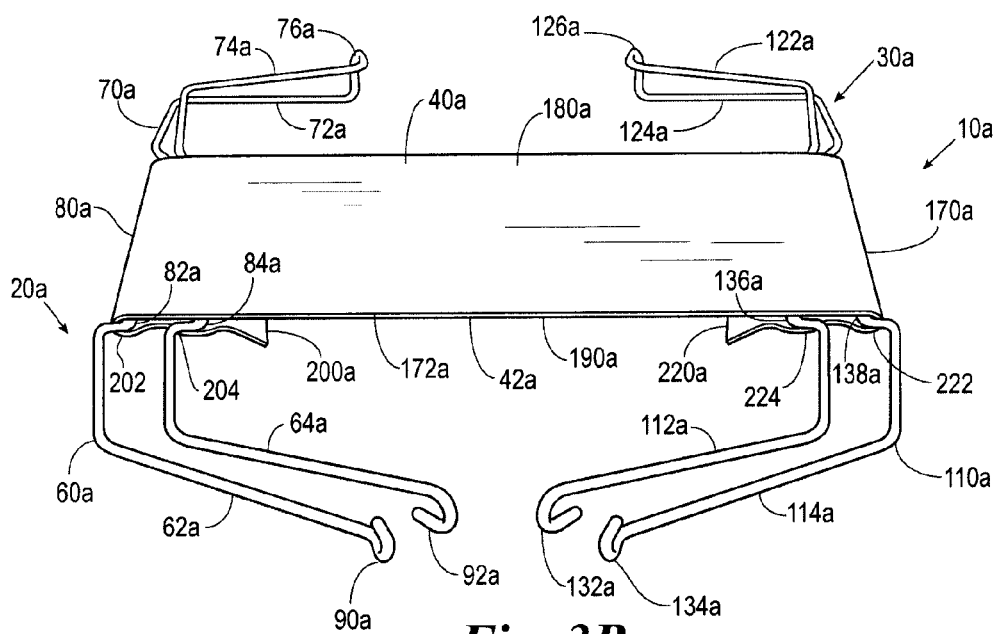
FIG. 3B is a second perspective view of the embodiment of the erectable and/or collapsible stone and casket plaque easel shown in FIG. 3A, in the collapsed position.

Referring now to FIGS. 3A-3B, designated generally by the reference numeral 10a is a stone and casket plaque easel. The stone and casket plaque easel 10a has a plurality of leg members and, in one embodiment shown in FIGS. 3A-3B, the stone and casket plaque easel 10a has a first leg member 20a and a second leg member 30a. The stone and casket plaque easel 10a also includes a support member 40a for supporting and/or holding a floral object (not shown).

As shown in FIGS. 3A-3B, the first leg member 20a and the second leg member 30a are each formed from a unitary piece of material. However, it should be understood that the first leg member 20a and the second leg member 30a may each be formed from more than one piece of material, if desired. The first leg member 20a has a first end 60a, a second end 70a, and a central portion 80a. The first end 60a includes a first member 62a and a second member 64a such that the first member 62a and the second member 64a are spaced in a substantially parallel relationship. The second end 70a includes a first member 72a and a second member 74a joined by a central member 76a. The first end 60a is substantially L-shaped having surface engaging members 90a and 92a for substantially supporting the first member 62a and second member 64a, respectively. The second end 70a is substantially L-shaped wherein the central member 76a is positioned for substantially supporting the second end 70a. The central portion 80a includes a first portion 82a and a second portion 84a.

The second leg member 30a has a first end 110a, a second end 120a, and a central portion 130a. The first end 110a includes a first member 112a and a second member 114a such that the first member 112a and the second member 114a are spaced in a substantially parallel relationship. The second end 120a includes a first member 122a and a second member 124a joined by a central member 126a. The first end 110a is substantially L-shaped having surface engaging members 132a and 134a for substantially supporting the first member 112a and second member 114a, respectively. The second end 120a is substantially L-shaped wherein the central member 126a is positioned for substantially supporting the second end 120a. The central portion 130a includes a first portion 136a and a second portion 138a.

As shown in FIGS. 3A-3B, the leg members may be constructed of a unitary piece of material such as, for example, 16 gauge wire. However, it should be understood that the leg members of the presently disclosed and claimed inventive concept(s) may be constructed of materials such as, for example, steel rod (tubular, flat, or profile shaped) and/or wire (coated or uncoated), aluminum rod (tubular, flat, or profile shaped) and/or wire (coated, anodized or uncoated), stainless steel rod (flat or profile shaped) and/or wire (coated or uncoated), plastic pieces of material having cylindrical, tubular, triangular, square, rectangular, polygonal, or other profile shapes or cross-sections of profile shapes, hollow, tubular or profile shaped materials made of metals or polymers, solid or hollow wood, synthetic or man-made materials, natural materials, or any other suitable material. Further, the material may be flexible or rigid.

Alternatively, the first leg member 20a and the second leg member 30a may be formed of two or more pieces of material. If the first leg member 20a and the second leg member 30a are formed of two or more pieces of material, the materials may differ or the materials may be the same. For example, if the first leg member 20a and the second leg member 30a are formed of two or more pieces of material, one of the leg members may be formed of steel and the other may be formed of aluminum. In another embodiment, each of the leg members may be formed of at least two or more materials. For example, a portion of at least one of the leg members may be steel and another portion of the leg member may be aluminum. The plurality of leg members may be constructed of the same material or a different material. For example, at least one of the plurality of leg members may be constructed of steel and the other leg members may be constructed of aluminum.

The leg members may have any size diameter, width, or profile dimensions and/or any length that is desired and useful for the particular use the stone and casket plaque easel 10a is put. In general, however, the stone and casket plaque easel 10a will have a height of from about 1" to about 6", more preferably a height from about 1" to about 4", and most preferably a height from about 1" to about 3".

The surface engaging members are generally in contact with a substrate (not shown) to thereby support and hold the stone and casket plaque easel 10a in a position suitable for use to support a floral object. The substrate may be any surface such as, for example, a floor, a platform, dirt, grass, fiber, plastic, tile, carpet, combinations thereof, or any surface capable of supporting the stone and casket plaque easel 10a thereon. It should be understood that the surface engaging members may be eliminated without altering the spirit and scope of the presently disclosed and claimed inventive concept(s).

Each embodiment of the stone and casket plaque easel 10a described herein could be used with or without anchoring materials known in the art to prevent the stone and casket plaque easel 10a from moving or tipping. The anchoring materials may be connected to the surface engaging members or alternatively be an extension of the leg assemblies. Examples of anchoring materials include, but are not limited to, adhesive, cohesive, spikes (metal or plastic), rubber feet or pads, combinations thereof, or any other materials capable of anchoring the stone and casket plaque easel 10a to the substrate. The anchoring material may be formed integrally or non-integrally with the stone and casket plaque easel 10a and may be constructed of the same or different material as the stone and casket plaque easel 10a.

The support member 40a for supporting and/or holding the floral object may be formed of the same material as the leg assemblies (i.e., steel) or may be formed of a different material than the leg members such as, for example, any of the materials discussed above. As shown in FIGS. 3A-3B, the support member 40a is substantially rectangular in shape and has a first end 160a, a second end 170a, a first side 172a, a second side 174a, a first surface 180a, and a second surface 190a. Though the support member 40a shown in FIGS. 3A-3B is substantially rectangular in shape, it should be understood that the support member 40a may be shaped in any manner to substantially conform to the shape of a casket and/or plaque (not shown) on which it is placed. The first end 160a of the support member 40a includes a first lip member 200a and the second end 170a of the support member 40 includes a second lip member 230a for ease of connecting and/or disconnecting each leg member to the support member 40a for erecting and/or collapsing the stone and casket plaque easel 10a.

The first lip member 200a and the second lip member 220a are located on the second surface 190a of the first end 160a and the second end 170a, respectively, of the support member 40a. The first lip member 200a defines a first retaining area 202a and a third retaining area 204a for retaining a portion of the first portion 82a and the second portion 84a, respectively, therein for connecting the leg assembly 20a to the support member 40a and to further permit rotation of the first leg member 20a between an expanded position and a collapsed position when the first leg member 20a is connected to the support member 40a.

The second lip member 220a defines a first retaining area 222a and a fourth retaining area 224a for retaining a portion of the first portion 136a and the second portion 138a, respectively, therein for connecting the leg assembly 30a to the support member 40a and to further permit rotation of the second leg member 30a between an expanded position and a collapsed position when the second leg member 30a is connected to the support member 40a. Though the lip members are shown located on the second surface 190a of the support member 40a, it should be understood that the lip members may be located on any portion of the support member 40a such that the lip members are capable of retaining a portion of each of the respective leg members therein. The lip members of the presently disclosed and claimed inventive concept(s) may be flexible or substantially flexible so as to bend outwardly away from the second surface 190a to facilitate engagement with a portion of each respective leg member. Rotation of each leg member within its respective lip member permits the stone and casket plaque easel 10a to form an open profile on one side of the easel 10a thus requiring less packaging space as well as permitting snap action of the easel 10a in either the collapsed or erected position.

As shown in FIG. 3B, when inserting a portion of each leg member into its respective retaining area, the user may need (although not necessary) to create a separation between the distal end of the lip member and the second surface 190a of the support member 40a for insertion of a portion of the leg member into its respective retaining area.

The lip members of the presently disclosed and claimed inventive concept(s) may be unitary in construction with the support member 40a, as shown in FIGS. 3A-3B, or the lip members may be formed separately from the support member 40a. The lip members may also be constructed of the same material as the support member 40a, or the lip members may be constructed of a different material than the support member 40a.

As shown in FIG. 3B, when collapsing the leg members for transportation, shipment, or storage, the leg members may be rotated inwardly toward a center portion 42a of the support member 40a. However, it should be understood that the leg members may be collapsed in any manner that permit transportation, shipment, or storage of the easel 10a.

Figure 4A:
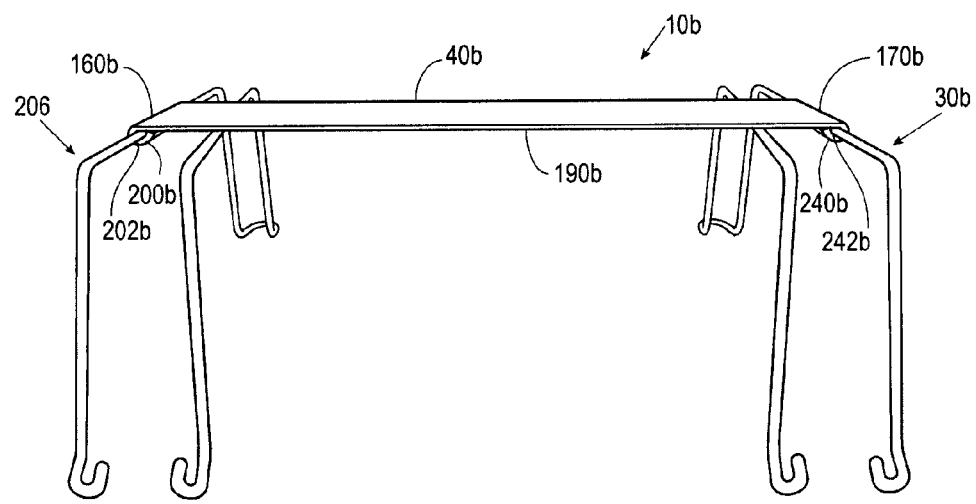
FIG. 4A is a perspective view of another embodiment of the erectable and/or collapsible stone and casket plaque easel of the presently disclosed and claimed inventive concept(s) in the erect position.
Figure 4B:
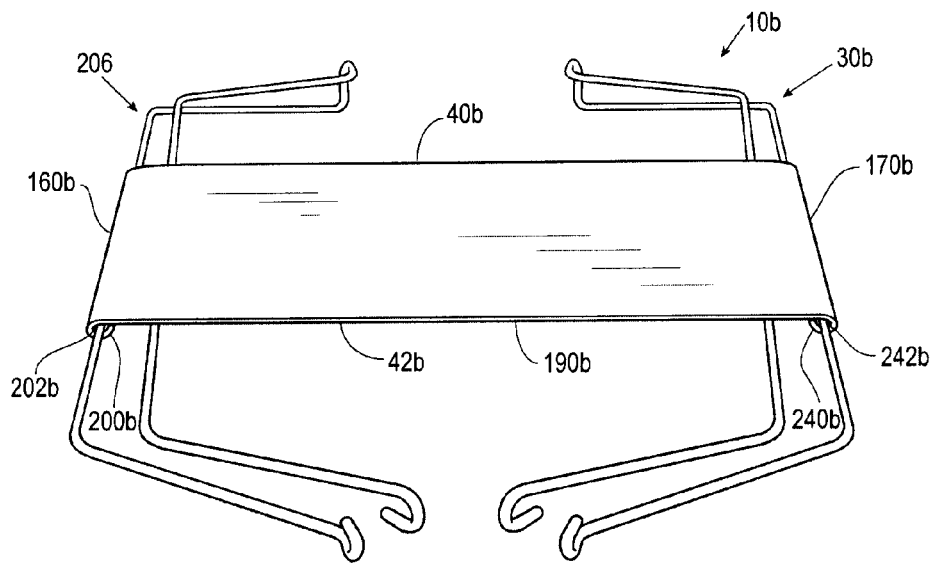
FIG. 4B is a second perspective view of the embodiment of the erectable and/or collapsible stone and casket plaque easel shown in FIG. 4A, in the collapsed position.

Referring now to FIGS. 4A-4B, shown therein is an easel 10b similar in purpose to the embodiment described in FIGS. 3A-3B. However, in FIGS. 4A-4B, the stone and casket plaque easel 10b has a first leg member 20b and a second leg member 30b. The stone and casket plaque easel 10b also includes a support member 40b for supporting and/or holding a floral object (not shown). A support member 40b includes a first lip member 200b and a second lip member 240b located on opposing ends of the support member 40b. The first lip member 200b is located on a second surface 190b of a first end 160b of a support member 40b. The second lip member 240b is located on the second surface 190b of a second end 170b of the support member 40b. Though the lip members are located on the second surface 190b of the first end 160b and the second end 170b of the support member 40b shown in FIGS. 4A-4B, it should be understood that the lip members may be located on any portion of the support member 40b such that the lip members are capable of retaining a portion of the leg assemblies therein.

The first lip member 200b defines a first retaining area 202b for retaining a portion of the first leg member 20b therein for connecting the first leg member 20b to the support member 40b and to further permit rotation of the first leg member 20b between an expanded position and a collapsed position when the first leg member 20b is connected to the support member 40a.

The second lip member 240b defines a second retaining area 242b for retaining a portion of the second leg member 30b therein for connecting the second leg member 30b to the support member 40b and to further permit rotation of the second leg member 30b between an expanded position and a collapsed position when the second leg member 30b is connected to the support member 40b. Rotation of each leg member within its respective lip member permits the stone and casket plaque easel 10b to form an open profile on one side of the easel 10a thus requiring less packaging space as well as permitting snap action of the easel 10a in either the collapsed or erected position.

The lip members of the presently disclosed and claimed inventive concept(s) may be unitary in construction with the support member 40b, as shown in FIGS. 4A-4B, or the lip members may be formed separately from the support member 40. The lip members may also be constructed of the same material as the support member 40b, or the lip members may be constructed of a different material than the support member 40b.

As shown in FIG. 4B, when collapsing the leg members for transportation, shipment, or storage, the leg members may be rotated inwardly toward a center portion 42b of the support member 40b. However, it should be understood that the leg members may be collapsed in any manner that permit transportation, shipment, or storage of the easel 10b.

Figure 5A:
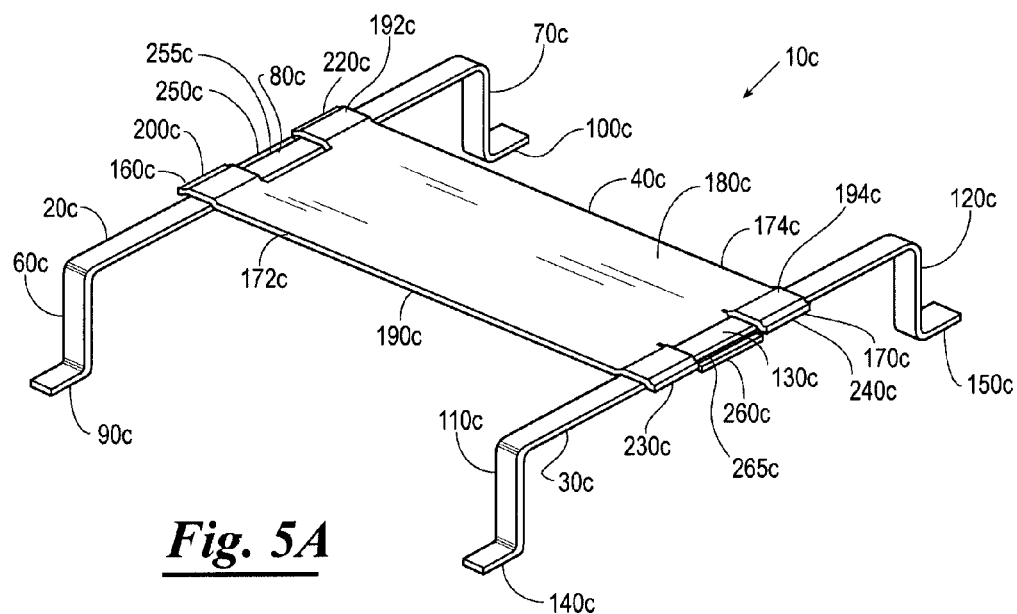
FIG. 5A is a perspective view of another embodiment of the erectable and/or collapsible stone and casket plaque easel of the presently disclosed and claimed inventive concept(s) in the erect position.
Figure 5B:
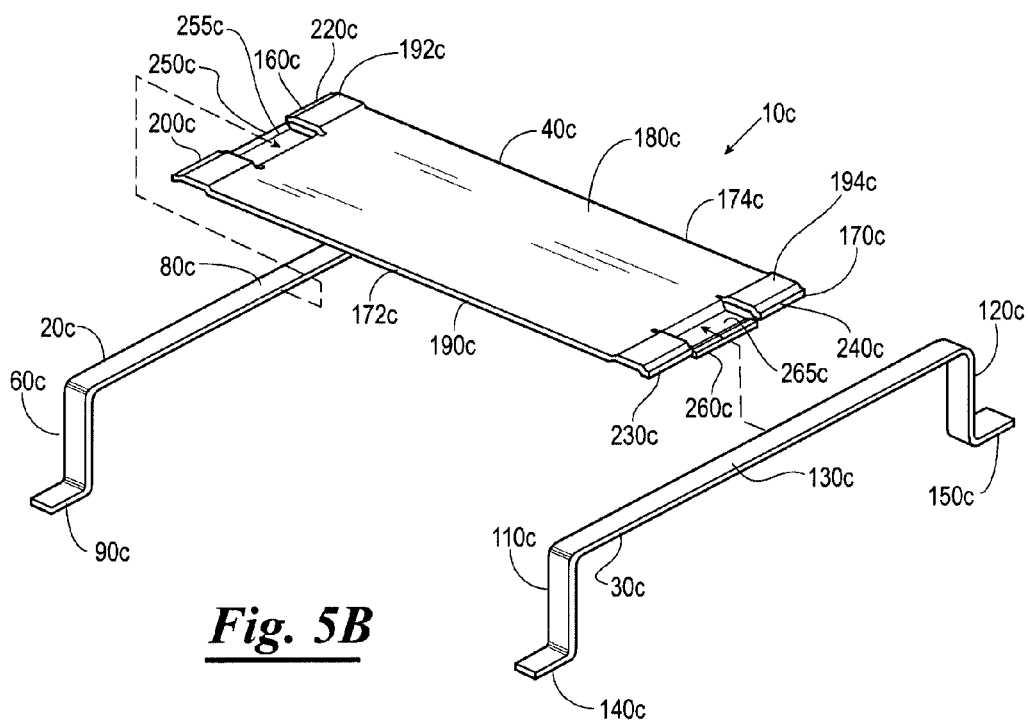
FIG. 5B is a second perspective view of another embodiment of the erectable and/or collapsible stone and casket plaque easel shown in FIG. 5A, in the collapsed position.

Referring now to FIGS. 5A-5B, designated generally by the reference numeral 10c is a stone and casket plaque easel. The stone and casket plaque easel 10c has a plurality of leg members and, in one embodiment shown in FIGS. 5A-5B, the stone and casket plaque easel 10c has a first leg member 20c and a second leg member 30c. The stone and casket plaque easel 10c also includes a support member 40c for supporting and/or holding a floral object (not shown).

The first leg member 20c has a first end 60c, a second end 70c, and a central portion 80c. Each end of the first end 60c and the second end 70c is substantially L-shaped having surface engaging members 90c and 100c, respectively, for supporting each end of the first leg member 20c. The second leg member 30c has a first end 110c, a second end 120c, and a central portion 130c. Each of the first end 110c and the second end 120c is substantially L-shaped having surface engaging members 140c and 150c, respectively, for supporting each end of the second leg member 30c.

As shown in FIGS. 5A-5B, the leg members may be constructed of a unitary piece of material, such as, for example, flattened aluminum rod. However, it should be understood that the leg members of the presently disclosed and claimed inventive concept(s) may be constructed of materials such as, for example, steel rod (tubular, flat, or profile shaped) and/or wire (coated or uncoated), aluminum rod (tubular, flat, or profile shaped) and/or wire (coated, anodized or uncoated), stainless steel rod (flat or profile shaped) and/or wire (coated or uncoated), plastic pieces of material having cylindrical, tubular, triangular, square, rectangular, polygonal, or other profile shapes or cross-sections of profile shapes, hollow, tubular or profile shaped materials made of metals or polymers, solid or hollow wood, synthetic or man-made materials, natural materials, or any other suitable material. Further, the material may be flexible or rigid.

Alternatively, the first leg member 20c and the second leg member 30c may be formed of two or more pieces of material. If the first leg member 20c and the second leg member 30c are formed of two or more pieces of material, the materials may differ or the materials may be the same. For example, if the first leg member 20c and the second leg member 30c are formed of two or more pieces of material, one of the leg members may be formed of steel and the other may be formed of aluminum. In another embodiment, each of the plurality of leg members may be formed of at least two or more materials. For example, a portion of at least one of the leg members may be steel and another portion of the leg member may be aluminum. The plurality of leg members may be constructed of the same material or a different material. For example, at least one of the plurality of leg members may be constructed of steel and the other leg members may be constructed of aluminum.

The leg members may have any size diameter, width, or profile dimensions and/or any length that is desired and useful for the particular use the stone and casket plaque easel 10c is put. In general, however, the stone and casket plaque easel 10c will have a height of from about 1" to about 6", more preferably a height from about 1" to about 4", and most preferably a height from about 1" to about 3".

The surface engaging members are generally in contact with a substrate (not shown) to thereby support and hold the stone and casket plaque easel 10c in a position suitable for use to support a floral object. The substrate may be any surface such as, for example, a floor, a platform, dirt, grass, fiber, plastic, tile, carpet, combinations thereof, or any surface capable of supporting the stone and casket plaque easel 10c thereon. It should be understood that the surface engaging members may be eliminated without altering the spirit and scope of the presently disclosed and claimed inventive concept(s).

Each embodiment of the stone and casket plaque easel 10c described herein could be used with or without anchoring materials known in the art to prevent the stone and casket plaque easel 10c from moving or tipping. The anchoring materials may be connected to the surface engaging members or alternatively be an extension of the leg members. Examples of anchoring materials include, but are not limited to, adhesive, cohesive, spikes (metal or plastic), rubber feet or pads, combinations thereof, or any other materials capable of anchoring the stone and casket plaque easel 10c to the substrate. The anchoring material may be formed integrally or non-integrally with the stone and casket plaque easel 10c and may be constructed of the same or different material as the stone and casket plaque easel 10c.

The support member 40c for supporting and/or holding the floral object may be formed of the same material as the leg members (i.e., aluminum) or may be formed of a different material than the leg members such as, for example, any of the materials discussed above. As shown in FIGS. 5A-5B, the support member 40c is substantially rectangular in shape and has a first end 160c, a second end 170c, a first side 172c, a second side 174c, a first surface 180c, and a second surface 190c. Though the support member 40c shown in FIGS. 5A-5B is substantially rectangular in shape, it should be understood that the support member 40c may be shaped in any manner to substantially conform to the shape of the casket and/or plaque. The support member 40c further includes a first lip member 192c defining a first retaining area 255c and a second lip member 194c defining a second retaining area 265c.

The support member 40c includes a pair of slit members (200c, 220c, 230c, and 240c) located at each of the first end 160c and the second end 170c, respectively, for ease of connecting and/or disconnecting the leg members to and/or from the support member 40c for erecting and/or collapsing the stone and casket plaque easel 10c. Each end further includes a central member (250c and 260c) for supporting the central portion 80c and 130c of each leg member. The slit members 200c and 220c, and the central member 250c cooperate to further define the first retaining area 255c. The slit members 230c and 240c, and the central member 260c cooperate to further define the second retaining area 265c.

As shown in FIG. 5B, when connecting each respective leg member to the support member 40c, the user may need (although not necessary) to create a separation between each central member (250c and 260c) and the respective abutting slit members for insertion of the leg member by moving the respective slit members in one direction and the respective central member in an opposing direction to permit the first leg member 20c to be positioned in the first retaining area 255c and the second leg member 30c to be positioned in the second retaining area 265c. Further, when dissembling the leg members from the support member 40c for transportation, shipment, or storage, the central members must be separated from the slit members in the same manner described above to disconnect each leg member from the support member (FIG. 5B).

The lip members may be constructed of the same material as the support member 40c, or the lip members may be constructed of a different material than the support member 40c.

Figure 6A:
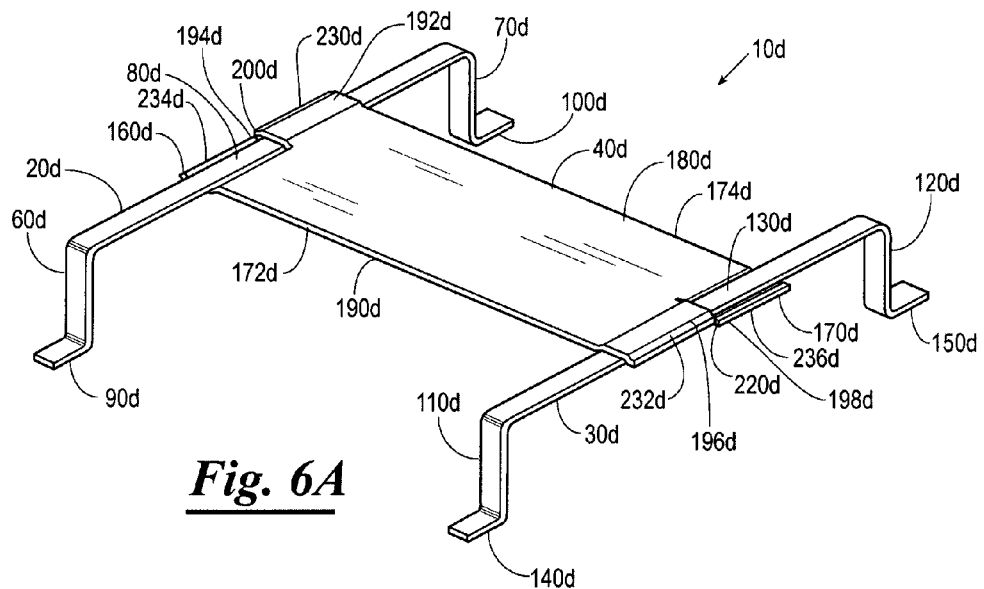
FIG. 6A is a perspective view of another embodiment of the erectable and/or collapsible stone and casket plaque easel of the presently disclosed and claimed inventive concept(s) in the erect position.
Figure 6B:
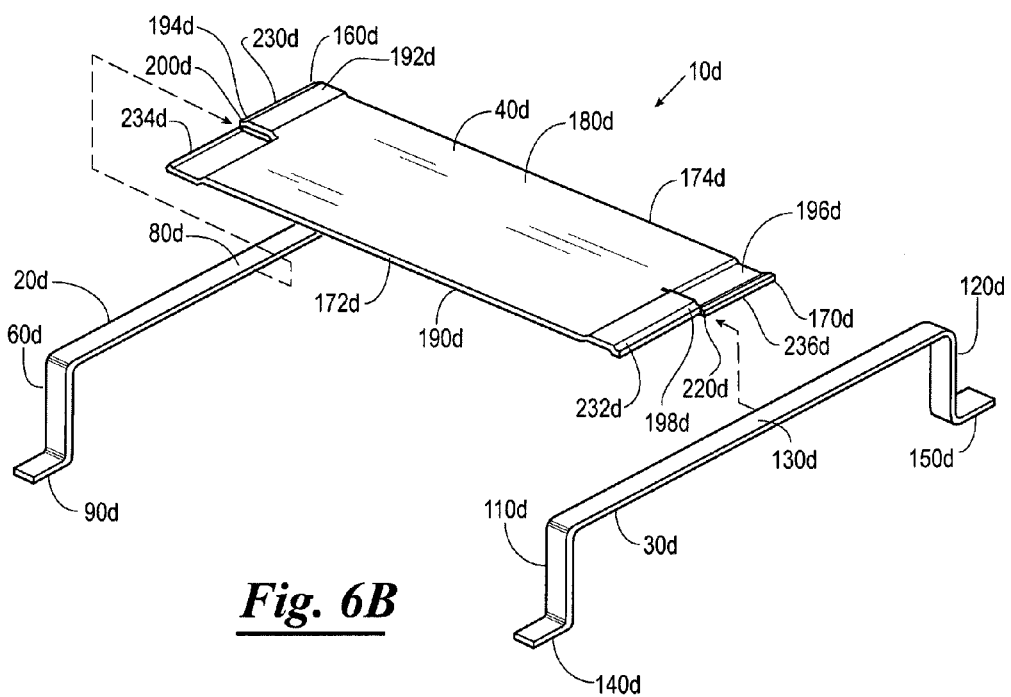
FIG. 6B is a second perspective view of the embodiment of the erectable and/or collapsible stone and casket plaque easel shown in FIG. 6A in the collapsed position.

Referring now to FIGS. 6A-6B, designated generally by the reference numeral 10d is a stone and casket plaque easel. The stone and casket plaque easel 10d has a plurality of leg members and, in one embodiment shown in FIGS. 6A-6B, the stone and casket plaque easel 10d has a first leg member 20d and a second leg member 30d. The stone and casket plaque easel 10d also includes a support member 40d for supporting and/or holding a floral object (not shown).

The first leg member 20d has a first end 60d, a second end 70d, and a central portion 80d. Each end of the first end 60d and the second end 70d is substantially L-shaped having surface engaging members 90d and 100d, respectively, for supporting each end of the first leg member 20d. The second leg member 30d has a first end 110d, a second end 120d, and a central portion 130d. Each of the first end 110d and the second end 120d is substantially L-shaped having surface engaging members 140d and 150d, respectively, for supporting each end of the second leg member 30d.

As shown in FIGS. 6A-6B, the leg members may be constructed of a unitary piece of material such as, for example, flattened aluminum rod. However, it should be understood that the leg members of the presently disclosed and claimed inventive concept(s) may be constructed of materials such as, for example, steel rod (tubular, flat, or profile shaped) and/or wire (coated or uncoated), aluminum rod (tubular, flat, or profile shaped) and/or wire (coated, anodized or uncoated), stainless steel rod (flat or profile shaped) and/or wire (coated or uncoated), plastic pieces of material having cylindrical, tubular, triangular, square, rectangular, polygonal, or other profile shapes or cross-sections of profile shapes, hollow, tubular or profile shaped materials made of metals or polymers, solid or hollow wood, synthetic or man-made materials, natural materials, or any other suitable material. Further, the material may be flexible or rigid.

Alternatively, the first leg member 20d and the second leg member 30d may be formed of two or more pieces of material. If the first leg member 20d and the second leg member 30d are formed of two or more pieces of material, the materials may differ or the materials may be the same. For example, if the first leg member 20d and the second leg member 30d are formed of two or more pieces of material, one of the leg members may be formed of steel and the other may be formed of aluminum. In another embodiment, each of the plurality of leg members may be formed of at least two or more materials. For example, a portion of at least one of the leg members may be steel and another portion of the leg member may be aluminum. The plurality of leg members may be constructed of the same material or a different material. For example, at least one of the plurality of leg members may be constructed of steel and the other leg members may be constructed of aluminum.

The leg members may have any size diameter, width, or profile dimensions and/or any length that is desired and useful for the particular use the stone and casket plaque easel 10d is put. In general, however, the stone and casket plaque easel 10d will have a height of from about 1" to about 6", more preferably a height from about 1" to about 4", and most preferably a height from about 1" to about 3".

The surface engaging members are generally in contact with a substrate (not shown) to thereby support and hold the stone and casket plaque easel 10d in a position suitable for use to support a floral object. The substrate may be any surface such as, for example, a floor, a platform, dirt, grass, fiber, plastic, tile, carpet, combinations thereof, or any surface capable of supporting the stone and casket plaque easel 10d thereon. It should be understood that the surface engaging members may be eliminated without altering the spirit and scope of the presently disclosed and claimed inventive concept(s).

Each embodiment of the stone and casket plaque easel 10d described herein could be used with or without anchoring materials known in the art to prevent the stone and casket plaque easel 10d from moving or tipping. The anchoring materials may be connected to the surface engaging members or alternatively be an extension of the leg members. Examples of anchoring materials include, but are not limited to, adhesive, cohesive, spikes (metal or plastic), rubber feet or pads, combinations thereof, or any other materials capable of anchoring the stone and casket plaque easel 10d to the substrate. The anchoring material may be formed integrally or non-integrally with the stone and casket plaque easel 10d and may be constructed of the same or different material as the stone and casket plaque easel 10d.

The support member 40d for supporting and/or holding the floral object may be formed of the same material as the leg members (i.e., aluminum) or may be formed of a different material than the leg members such as, for example, any of the materials discussed above. As shown in FIGS. 6A-6B, the support member 40d is substantially rectangular in shape and has a first end 160d, a second end 170d, a first side 172d, a second side 174d, a first surface 180d, and a second surface 190d. Though the support member 40d shown in FIGS. 6A-6B is substantially rectangular in shape, it should be understood that the support member 40d may be shaped in any manner to substantially conform to the shape of the casket and/or plaque. The support member 40d further includes a first lip member 192d defining a first retaining area 194d and a second lip member 196d defining a second retaining area 198d.

The support member 40d includes a pair of slit members (200d and 220d, respectively) located at a central portion of each of the first end 160d and the second end 170d, respectively, for ease of connecting and/or disconnecting the leg members to the support member 40d for erecting and/or collapsing the stone and casket plaque easel 10d thereby creating upper members 230d and 232d and lower members 234d and 236d on each end of the support member 40d and cooperating to define the first retaining area 235d on the first end 160d of the easel 10d for placement of the first leg member 20d therein and the second retaining area 237d on the second end 170d of the easel 10d for placement of the second leg member 30d therein. Though each slit is shown at the central portion of each end, it should be understood that the slit may be located anywhere along each end of the support member 40d.

As shown in FIG. 6B, when connecting each respective leg member to the support member 40d, the user may need (although not necessary) to create a separation along each slit for insertion of the leg member by moving the upper member 230d and the lower member 234d of the first lip member 192d in opposing directions to permit the first leg member 20d to be positioned in the first retaining area 194d and moving the upper member 232d and the lower member 236d of the second lip member 196d in opposing directions to permit the second leg member 30d to be positioned in the second retaining area 198d. Further, when dissembling the leg members from the support member 40d for transportation, shipment, or storage, the slits may be separated to disconnect each leg member from the support member (FIG. 6B) in the same manner as described above.

Each leg member may be supported and braced by each of the upper and lower members located on each end of the support member 40d. The upper and lower members may be constructed of the same material as the support member 40d, or the upper and lower members may be constructed of a different material than the support member 40d.

While methods of collapsing and methods of erecting the stone and casket plaque easel have been described herein, it is to be understood that other methods of collapsing the easels of the presently disclosed and claimed inventive concept(s) will be evident to a person having ordinary skill in the art and therefore, such additional methods of collapsing and methods of erecting the stone and casket plaque easel are also within the scope of the presently disclosed and claimed inventive concept(s).

The various embodiments of the stone and casket plaque easel described herein in FIGS. 1-6, may be further shipped and/or stored. To ship the various embodiments of the stone and casket plaque easel described herein in FIGS. 1-6, the plurality of legs of the stone and casket plaque easel may be collapsed as described hereinabove; the stone and casket plaque easel may then be placed into a shipping container such as, for example, a box or crate, and the easel may be shipped to a predetermined location. Further, the various embodiments of the stone and casket plaque easel described herein in FIGS. 1-6, may be placed into a storage area for an indefinite period of time wherein the plurality of legs are collapsed so as to store the easel in a storage area for an indefinite period of time.

It is also to be understood that the presently disclosed and claimed inventive concept(s) also encompasses any embodiments described herein or modifications thereof with the skill of a person in the art. For example, any of the embodiments of the stone and casket plaque easel described herein may be self-erecting, self-collapsing, self-erecting and self-collapsing, semi-self-erecting, semi-self-collapsing, or semi-self-erecting and semi-self-collapsing. Also, any of the embodiments of the presently disclosed and claimed inventive concept(s) described herein may be made so that no more than one assembly must be accomplished to maintain the easel in the erect position, semi-erect position, collapsed position, or semi-collapsed position.

Changes may be made in the construction and operation of the various components, elements and assemblies described herein or in the steps or sequence of steps of the methods described herein without departing from the spirit and scope of the presently disclosed and claimed inventive concept(s).

What is claimed is:

1. A method of forming a collapsible floral plaque for at least one of a casket and a headstone, the collapsible floral plaque being capable of being supported on a support surface and comprising a first leg member, a second leg member, and a support member, the support member having a first flexible lip member defining a first retaining area and a second flexible lip member defining a second retaining area, wherein the first flexible lip member of the support member includes an upper member and a lower member formed by a first slit member positioned in a central portion of the first flexible lip member so as to cooperate to define a first retaining area, and the second flexible lip member includes an upper member and a lower member formed by a second slit member positioned in a central portion of the second flexible lip member so as to cooperate to define a second retaining area, and wherein the first leg member and the second leg member are not attached to the support member when the floral plaque is in a collapsed position, the method comprising the steps of:

> moving the floral plaque from the collapsed position to an expanded position by positioning the first leg member in the first retaining area of the support member and positioning the second leg member in the second retaining area of the support member, and wherein the step of positioning the first leg member in the first retaining area comprises moving the upper member and the lower member of the first flexible lip member in opposing directions to permit the first flexible lip member to be positioned in the first retaining area and wherein the step of positioning the second leg member in the second retaining area further comprises moving the upper member and the lower member of the second flexible lip member in opposing directions to permit the second flexible leg member to be positioned in the second retaining area;
>
> disposing a floral grouping on the support member of the floral plaque; and
>
> disposing the floral plaque having the floral grouping thereon on at least one of the casket and headstone for display of the floral grouping thereon.

2. A method of forming a collapsible floral plaque for at least one of a casket and a headstone, the collapsible floral plaque being capable of being supported on a support surface and comprising a first leg member having a first end and a second end, a second leg member having a first end and a second end, and a support member, the support member having a first flexible lip member defining a first retaining area and a second flexible lip member defining a second retaining area, wherein the first flexible lip member of the support member includes an upper member and a lower member formed by a first slit member positioned in a central portion of the first flexible lip member so as to cooperate to define a first retaining area, and the second flexible lip member includes an upper member and a lower member formed by a second slit member positioned in a central portion of the second flexible lip member so as to cooperate to define a second retaining area, the method comprising the steps of:

> positioning the first leg member in the first retaining area of the support member by moving the upper member and the lower member of the first flexible lip member in opposing directions to permit the first flexible leg member to be positioned in the first retaining area, whereby the first leg member is detachably connected to the support member;
>
> positioning a second leg member in the second retaining area of the support member by moving the upper member and the lower member of the second flexible lip member in opposing directions to permit the second flexible leg member to be positioned in the second retaining area, whereby the second leg member is detachably connected to the support member; and
>
> positioning the first leg member and the second leg member about a portion of at least one of a casket and a headstone such that the first end and the second end of the first leg member are positioned on opposing sides of the casket or headstone and the first end and the second end of the second leg member are positioned on opposing sides of the casket or headstone, thereby supporting the support member on the casket or headstone.

3. The method of claim 2, further comprising the step of detaching the first leg member and the second leg member from the support member by removing the first leg member from the first retaining area and removing the second leg member from the second retaining area.

4. The method of claim 3, wherein the first leg member and the second leg member are removed from the support member by moving a distal end of the first lip member away from the support member to permit the first leg member to be removed from the first retaining area and moving a distal end of the second lip member away from the support member to permit the second leg member to be removed from the second retaining area.

* * * * *